United States Patent

[11] 3,613,751

| | | |
|---|---|---|
| [72] | Inventor | Daniel P. Juhasz<br>Gardena, Calif. |
| [21] | Appl. No. | 844,428 |
| [22] | Filed | July 24, 1969 |
| [45] | Patented | Oct. 19, 1971 |
| [73] | Assignee | Monogram Industries, Inc.<br>Los Angeles, Calif. |

[54] ADJUSTABLE SCREWDRIVER
1 Claim, 8 Drawing Figs.

[52] U.S. Cl. .................................................. 144/32,
81/524, 192/56, 192/150, 64/28
[51] Int. Cl. ...................................................... B25b 23/14
[50] Field of Search .......................................... 144/32;
192/56; 64/28–30; 81/52.4

[56] References Cited
UNITED STATES PATENTS

| | | | |
|---|---|---|---|
| 2,762,403 | 9/1956 | Ferm et al. | 144/32 |
| 2,962,880 | 12/1960 | May | 64/28 |
| 3,012,456 | 12/1961 | Dracka | 81/52.4 |
| 3,024,682 | 3/1962 | Finkle | 81/52.4 |
| 3,168,944 | 2/1965 | Livermont | 81/52.4 X |

*Primary Examiner*—Donald R. Schran
*Attorney*—Robert E. Geauque

ABSTRACT: An adjustable screwdriver assembly in which an adjustable spring assembly is employed operating upon a ball slip clutch assembly, the spring assembly comprising a plurality of belleville washers. The clutch assembly is connected to a gear transmission unit which in turn is capable of effecting rotation of the screwdriver bit. The screwdriver bit is retained in place by an adjustable ball and groove connection.

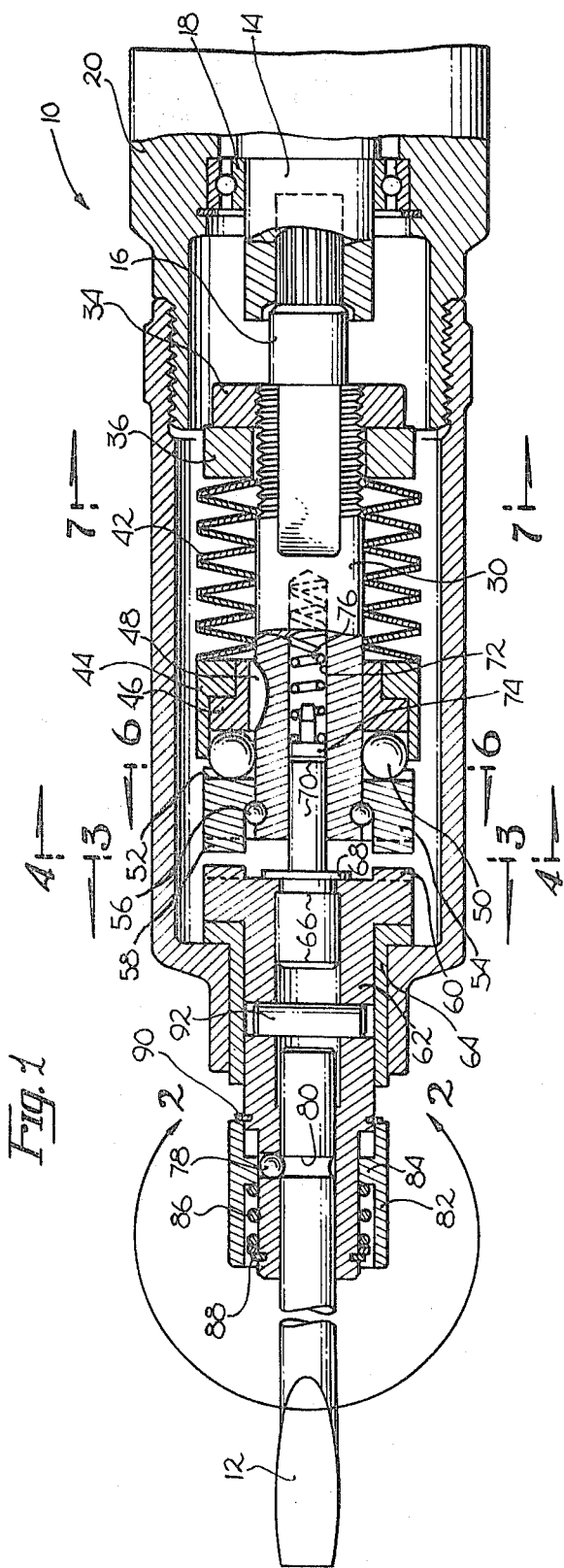

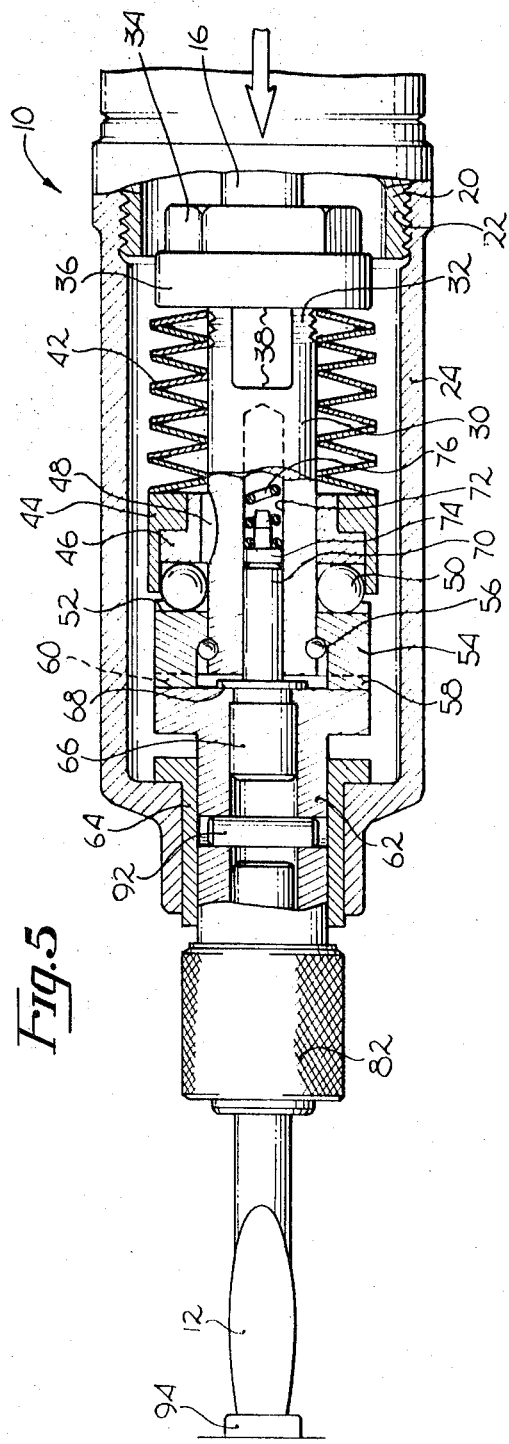
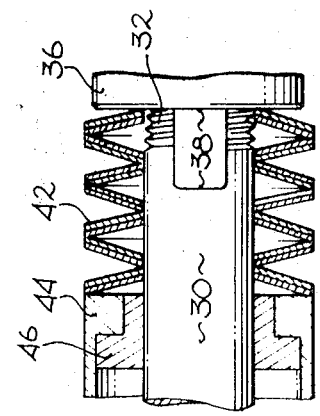
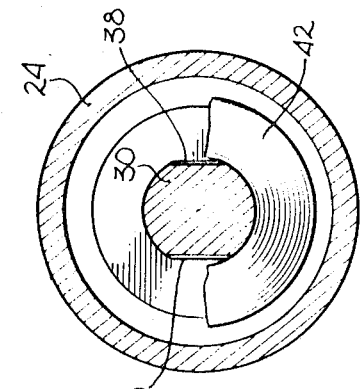
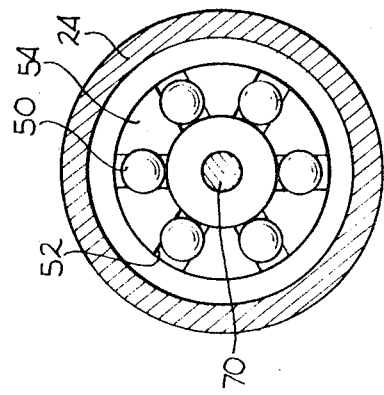

ADJUSTABLE SCREWDRIVER

BACKGROUND OF THE INVENTION

The use of power-driven screwdrivers is quite common. Such screwdriver assemblies usually include a gearing down unit and some form of slip clutch. The purpose of the gearing down unit is to decrease the revolutions per minute of the power input which is necessary to install screw fasteners. The clutch is to disengage the screwdriver when the screw fastener is completely installed.

Most power-driven screwdriver assemblies are employed in manufacturing. The installation of screw fasteners in one type of manufacturing may require a substantially different torque than that required in a different area of manufacturing. For example, a much larger screw demanding a close tolerance of installation is necessary in aircraft where a smaller screw of not such a high degree of tolerance of installation is employed in the automotive manufacturing area. If a power-driven screwdriver designed for aircraft manufacturing is employed in automobile manufacturing, may screw fasteners would probably be broken and their threads stripped.

To design a power-driven screwdriver to be usable under various load conditions, an effort has been made to provide some form of adjustable screwdriver. Usually the adjustment is in the form of a biased slip clutch assembly. Heretofore, such biasing arrangements have been complex in design, complex in function and complex in adjustment. Also, their physical size has frequently prevented their use in certain confining locations. Further, the variance of the adjustment is usually limited, that is within a 100 to 200 percent range. Quite frequently a wider range is necessary.

SUMMARY OF THE INVENTION

An adjustable screwdriver assembly in which a plurality of belleville washers are mounted upon the power input shaft, the washers being adjustable longitudinally to exert a variable compression force, the washers exerting their force upon a gearing unit which is engageable or disengageable with a screwdriver bit retaining assembly. A second biasing means is employed between the power input shaft and the screwdriver bit retaining assembly to normally maintain the gearing unit in the nonengageable position. Between the gearing unit and the belleville washers is a ball slip clutch. The screwdriver bit retaining assembly includes a movable ball which is to cooperate with a groove in the screwdriver bit thereby retaining the bit in place.

An object of this invention is to provide an extremely wide range of adjustment of screwdriver torque.

Another object of the invention is to provide an adjustable screwdriver assembly which is not complex in design nor complex in adjustability.

Another object of this invention is to provide a screwdriver assembly which is small in physical size.

Other objects of this invention will no doubt become apparent as the description of the invention proceeds.

BRIEF DESCRIPTION OF THE DRAWING

FIG. 1 is a longitudinal sectional view of the power-operated adjustable screwdriver assembly of this invention showing the screwdriver bit in the nonengaged position;

FIG. 2 is an exploded view taken along line 2—2 of FIG. 1 showing the screwdriver bit engaging unit in the position to effect removal and insertion of the screwdriver bit;

FIG. 3 is a partly-in-section view taken along line 3—3 of FIG. 1;

FIG. 4 is a partly-in-section view taken along line 4—4 of FIG. 1;

FIG. 5 is a view similar to FIG. 1 but showing the adjustable screwdriver assembly of this invention with the screwdriver bit in the engaged position;

FIG. 6 is a partly-in-section view taken along line 6—6 of FIG. 5;

FIG. 7 is a partly-in-section view taken along line 7—7 of FIG. 5; and

FIG. 8 is an exploded view of the belleville washer assembly showing the washers in an intermediate adjustment position.

DETAILED DESCRIPTION OF THE SHOWN EMBODIMENT

Referring to the drawings there is shown an adjustable screwdriver assembly 10 which is attached to screwdriver bit 12. Power from an air motor (not shown) is to be transmitted by means of the air motor shaft 14 to drive shaft 16. Shaft 14 is rotatably supported by means of bearing 18 within motor housing 20. Motor housing 20 has a threaded portion 22 which facilitates connection of housing 20 to screwdriver assembly housing 24. Shaft 16 terminates in a spline connection 26 which is to cooperate with a corresponding spindle 28 of the air motor.

Drive shaft 16 includes an enlarged portion 30 which is threaded 32 at one end thereof. Nut 34 is to cooperate with threads 32 and be movable therealong. A sleeve 36 is to abut nut 34 and surround the threads 32 but not be engaged with threads 32. Enlarged portion 30 has opposite flattened areas 38 and 40 extending through the threads 32. Sleeve 36 is correspondingly flattened on opposite sides thereof to cooperate with area 38 and 40 to prevent its rotation about enlarged portion 30.

A plurality of belleville washers 42 are mounted about enlarged portion 30 with one of the washers 42 abutting sleeve 36. In FIGS. 1 and 5 the washers 42 are stacked in series which increases the deflection in proportion to the number of washers, the load remaining the same as with a single washer. In FIG. 8 a combination parallel stacking and a series stacking of the washers 42 is accomplished. Theoretically, the parallel stacking increases load capacity in proportion to the number of washers with the travel being the same. If a greater load and shorter travel is required than that given by the two-parallel washer arrangement of FIG. 8, a three-parallel (or greater number) could be readily employed. The main advantage in employing a parallel washer arrangement is that substantial load variance can be achieved within the same travel of the nut 34. In other words, if the screwdriver assembly 10 is to be employed in light manufacturing, the washers 42 would probably be arranged in series and loaded with a small force. Where large screw fasteners are used, a greater spring force may be desired with the washers 42 arranged in a series-parallel arrangement. Generally speaking, the springs in such an arrangement must be stacked in equal numbers at each location along the shaft, such as two and two, three and three, etc.

Washers 42 abut retainer 44 which is press fitted into supporting sleeve 46. Sleeve 46 is fixed to rotate with shaft 16 by means of key 48. Longitudinal movement of the retainer 44 and the sleeve 46 with respect to enlarged portion 30 is permitted. A plurality of balls 50 (six in number are shown) are retained by retainer 44 adjacent enlarged portion 30 and in contact with sleeve 46. Each of the balls 50 are to individually rest within recesses 52 of clutch plate 54. Clutch plate 54 is rotatably supported upon enlarged portion 30 with the ball bearings 56 facilitating ease of movement. Ball bearings 56 also function as a stop for longitudinal movement of the clutch plate 54.

About the periphery of clutch plate 54 are series of gear teeth 58 which are to cooperate with gear teeth 60 of drive element 62. Drive element 62 is rotatably supported upon internal sleeve 64 which is press fitted within housing 24 and stationary therewith. Press fitted within drive element 62 is a rod 66 which has a shoulder element 68 to abut the external portion of drive element 62. Extending from shoulder element 68 is a pivotal rod 70 which is to cooperate in a rotating manner with an aperture 72 within enlarged portion 30. A spring retainer pin 74 is to abut the end of pivotal rod 70 and to cooperate with coil spring 76 held within aperture 72. Spring 76 is to be of the compression type and functions to normally maintain gear teeth 58 not in engagement with gear teeth 60.

Screwdriver bit 12 is nonrotatably supported within drive element 62 and when installed therein is retained against longitudinal movement by locking ball 78. Bit 12 has a groove 80 which is to cooperate with ball 78. A stop pin 92 is supported within drive element 62 to function as a limiter of the insertion of bit 12. Supported exteriorly about drive element 62 is a retaining sleeve 82 which has an annular locking pawl 84. A compression spring 86 operates between locking ring 88 on drive element 62 and locking pawl 84 and normally causes the locking pawl 84 to rest upon ball 78, thereby maintaining ball 78 within groove 80. A locking ring 90 functions as a forward movement limiter of the sleeve 82.

The operation of the adjustable screwdriver of this invention is as follows:

To install the bit 12 the sleeve 82 is moved against spring 86 thereupon permitting radial movement of ball 78 upon insertion of the bit 12. Upon location of groove 80 with the ball 78 the sleeve 82 returns to its original position with the locking pawl 84 preventing withdrawal of the ball 78 thereby restraining bit 12 from longitudinal movement. It is to be understood that any one of several bit designs could be employed and also other types of bits such as, for example, a drill bit.

With the bit 12 installed, the bit is then placed in position within a slot of screw fastener 94 and a manual longitudinal force exerted against the fastener 94. This manual force causes compression of spring 76 and engagement of gear teeth 58 and 60. The rotation of shaft 16 by the air motor is thereupon transferred to drive element 62 and to bit 12. When the fastener 94 is fully installed, the clutch plate 54 is removed from engagement with the balls 50 and the rotational torque of shaft 16 is no longer transmitted to drive element 62. By the adjusting of nut 34, the spring force of the washers 42 can be varied from essentially zero to 1,000 pounds with a series arrangement. If a parallel washer arrangement is desired, the force can be substantially increased.

I claim:

1. An adjustable screwdriver assembly comprising:
   a power input shaft;
   an adjustable nut assembly threadably secured to said power input shaft;
   a biasing assembly surrounding said input shaft and being in contact with said nut assembly, said biasing assembly comprising a plurality of belleville washers;
   a clutching assembly including a retaining sleeve assembly and a clutch plate, said biasing assembly being in contact with said retaining sleeve assembly, said retaining sleeve assembly being fixed to said input shaft, a plurality of balls each supported within a particular location within said retaining sleeve assembly, said balls also being normally resting in individual recesses formed within said clutch plate, said biasing assembly normally tending to maintain said balls within said recesses;
   a power transmitting assembly including a first gear element and a second gear element, said first gear element being directly connected to said clutch plate, said second gear element being directly connected to an output drive element, a second biasing assembly located intermediate said first and second gear elements and normally maintaining disengagement of said gear elements;
   a housing surrounding said biasing assembly and said clutching assembly and said power transmitting assembly, said input shaft and said drive element extending exteriorly of said housing;
   a screwdriver bit retaining unit connected to said drive element and located exteriorly of said housing, said screwdriver bit retaining unit including a longitudinally movable sleeve located about said drive element, a third biasing means connected between said drive element and said sleeve, upon movement of said sleeve away from said housing against the bias of said third biasing means removal and insertion of the screwdriver bit is permitted within said unit, said sleeve being readily graspable by a human hand to facilitate the movement of said sleeve.